United States Patent Office 2,854,174
Patented Sept. 30, 1958

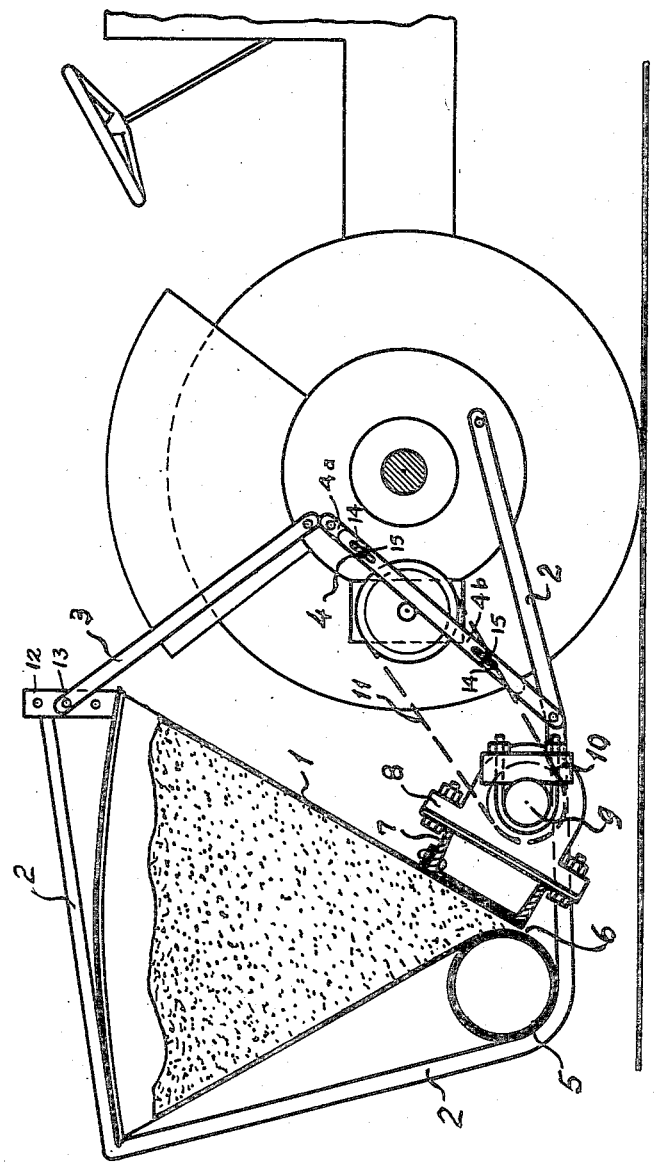

2,854,174

FERTILIZER SPREADING DEVICE ATTACHABLE TO A TRACTOR

Herbert Johannes Björkell, Lapptrask, and Kaarlo Ilmari Siltala, Porlammi, Finland Application January 6, 1954, Serial No. 402,530

4 Claims. (Cl. 222—203)

The known mechanical spreading devices for fertilizer are very defective and not capable of even operation, particularly if the fertilizer is to be spread sparingly. The lumps of such fertilizer have also greatly hampered the operation of the devices.

The object of the present invention is to eliminate the said drawbacks with a fertilizer spreading device attachable to a tractor, comprising a container for fertilizer, said container resting on supporting irons at the rear part of the tractor, the lower part of the container having a transverse spreading slit. Fastened to the springy wall of the container close to the spreading slit for producing an even flow of fertilizer is a vibrator getting its motive power from the transmission of the tractor.

The accompanying drawing ilustrates by way of example a partly sectional view of a device constructed according to the invention.

The container 1 is made by welding of steel plate and is secured to the rear part of the tractor chassis with the aid of supporting irons 2, 3 and 4 so that the regulation of its height is made possible. An apertured bracket 12 is secured to the top portion of the container, and the upper end of supporting iron 3 is adapted to be connected to different portions of the bracket by means of a suitable pin 13 passing through the apertures in the bracket. Supporting iron 4 is composed of two elongated, flattened juxtaposed members 4a and 4b each of which is provided with two longitudinally extending slots 14 having conventional nut and bolt assemblies 15 extending therethrough whereby the length of supporting iron 4 may be adjusted in accordance with the desired height of the container.

On the rear wall of the container 1 is tangentially fastened a strong pipe 5 so that the rear wall becomes stiff an unspringy. On the contrary the lower part of the front wall is springy.

At the bottom of the container the springy front wall and stiff rear wall are spaced from one another thereby forming a spreading slit 6 therebetween which extends transverse to the direction of movement of the tractor to which the device is attached. Due to the curvature of the outer surface of pipe 5 and accordingly the lower portion of the rear wall, the throat of the spreading slit 6 gradually narrows such that at the outlet of the slit, the front wall is in a plane substantially parallel to a plane which is tangent to the adjacent portion of the rear wall.

To effect an even flow of the fertilizer to be spread a vibrator is fastened to the front wall of the container 1, said vibrator comprising a U-formed beam 7 with bearings 8 fastened thereon, a shaft 9 being journalled in said bearings. Eccentric weights 10 are suitably fastened to shaft 9.

The shaft 9 is driven through the intermediary of a belt 11 from the transmission of the tractor. The weights 10 act by the rotation of the shaft as unbalanced masses causing vibrations, which are transferred to the springy front wall of the container 1. These vibrations cause a frequent narrowing and widening of the spreading slit thus hindering the forming of vaults between the fertilizer grains, which otherwise would take place in such a narrow slit, which is needed for a sparing spreading of the fertilizer. The vibrations also eliminate the harmful effect of the lumps as they are crushed in the throat 6 by flowing downward.

For varying the amount of fertilizer to be spread per unit of surface the width of the slit 6 is arranged to be regulated in some known manner. This is not shown on the drawing.

The invention is not limited to the details of construction and arrangement herein shown and described and various modifications may be introduced within the scope of the following claims.

What I claim is:

1. A spreading device which comprises a hopper having first and second walls spaced from one another and defining a slit therebetween at the lower portions of said walls, the lower portion of said first wall being rigid, said second wall being formed of resilient sheet material, the inner surface of one of said walls adjacent said slit being arcuate in configuration whereby the throat of the spreading slit gradually narrows to the outlet thereof.

2. A device as defined in claim 1 wherein said one wall is the wall having a rigid lower portion.

3. A device as defined in claim 1 wherein said one wall includes a rigid tubular member at the lower portion thereof.

4. A spreading device which comprises a hopper having first and second walls spaced from one another and defining a slit therebetween at the lower portions of said walls, the lower portion of said first wall being rigid, said second wall being formed of resilient sheet material, a vibrating means connected to and supported solely by the lower portion of said second wall adjacent one edge of said slit, the inner surface of said first wall adjacent said slit being arcuate in configuration whereby the throat of the spreading slit gradually narrows to the outlet thereof.

References Cited in the file of this patent

UNITED STATES PATENTS

| | | |
|---|---|---|
| 379,193 | Barnard | Mar. 6, 1888 |
| 758,119 | Sturtevant | Apr. 26, 1904 |
| 1,545,376 | Weatherby | July 7, 1925 |
| 2,532,518 | Scott | Dec. 5, 1950 |
| 2,560,480 | Rogers | July 10, 1951 |
| 2,672,259 | Hobgood | Mar. 16, 1954 |